Patented July 4, 1944

2,353,091

UNITED STATES PATENT OFFICE 2,353,091

MANUFACTURE OF ALIPHATIC AMINES

Ober C. Slotterbeck, Rahway, and Allen R. Kittleson, Westfield, N. J., assignors to Standard Oil Development Company, a corporation of Delaware No Drawing. Application July 12, 1941, Serial No. 402,230

6 Claims. (Cl. 260—583)

The present invention relates to the manufacture of primary aliphatic amines, and more particularly to a means whereby primary aliphatic amines may be readily and economically produced from easily obtainable raw materials.

By the process of this invention an aliphatic compound which readily yields an olefin by the removal of water in the presence of a dehydrating catalyst is heated with hydrogen cyanide in the presence of such a catalyst. The preferred aliphatic compounds are the alcohols, ethers, and olefins having a carbon chain of from 2 to 10 carbon atoms in the molecule. If an olefin is used, water must also be present. In the place of hydrogen cyanide other compounds capable of splitting off hydrogen cyanide under the conditions of the reaction may be used. Such compounds include formamide, dicyanogen and the like. The molar ratio of the aliphatic compound to the hydrogen cyanide or similar compound in the reaction should be at least 1:1, and an excess of the aliphatic compound is preferred. The catalyst employed may be any dehydrating catalyst, such as bauxite, titania, activated alumina, thoria, and the like.

The reaction is preferably carried out at atmospheric or lower pressures, but in some cases somewhat higher pressures may be desirable when using the more volatile reactants, and pressures up to 100 pounds per square inch may sometimes be used. The temperature of the reaction is preferably from 200° to 400° C., and a more particularly desirable range is from 275° to 350° C.

When an olefin is employed as a reactant, a substantial amount of water, preferably at least one molecular equivalent of the olefin, must be present in the reactor, and this water may be supplied in the form of steam.

The product of the reaction is generally a mixture of primary aliphatic amines, and from this it is evident that polymerization of the olefin formed in the reaction has taken place to some extent. Usually the polymerization does not take place beyond the production of the trimer of the original olefin.

The mechanism of the reactions involved in the present process are not fully understood, but it is believed that the hydrogen cyanide reacts with the olefin in the form of hydrogen isocyanide, with which the hydrogen cyanide exists in equilibrium. The reaction of the olefin with the isocyanide produces an aliphatic isonitrile. This isonitrile then reacts with the water formed by dehydration or introduced into the reactor to form the amine and formic acid, the latter probably breaking down under conditions of the reaction. It is believed that these reactions are illustrated by the following equations which describe such a mechanism in connection with the reaction of diethyl ether with hydrogen cyanide in the presence of a dehydrating catalyst:

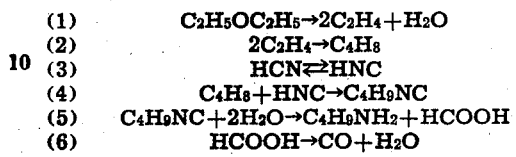

(1)          $C_2H_5OC_2H_5 \rightarrow 2C_2H_4 + H_2O$
(2)          $2C_2H_4 \rightarrow C_4H_8$
(3)          $HCN \rightleftarrows HNC$
(4)          $C_4H_8 + HNC \rightarrow C_4H_9NC$
(5)     $C_4H_9NC + 2H_2O \rightarrow C_4H_9NH_2 + HCOOH$
(6)          $HCOOH \rightarrow CO + H_2O$ The product obtained as a mixture of amines is useful as such as an anticorrosion agent or color stabilizing agent for oils, asphalts, etc. The mixture may, if desired, be separated into its individual components, which may be purified and used for various chemical syntheses.

The process of the invention may be conveniently carried out by passing a mixture of the aliphatic material and hydrogen cyanide over the catalyst contained in a reaction chamber or tube which is being heated to the desired temperature. The product may be passed into an acid, such as hydrochloric acid, and any unreacted ether, alcohol, etc., may be recycled for further use. The amines may be recovered from the acid solution by neutralizing wtih alkali, and the individual amines may, if desired, be recovered by fractionation.

The method of the present invention may be illustrated by the following examples, but the invention is not to be restricted in scope in any way by these examples.

Example I 100 parts by volume of a mixture of diethyl ether and hydrogen cyanide, containing three mols of the former for each mol of the latter and representing about 72 parts by weight, were vaporized and passed over 170 parts by weight of activated alumina in a reaction chamber at 300° to 340° C. over a period of five hours. 38 parts by volume of a condensable product were collected which separated into 12 parts by volume of an oily layer and 26 parts by volume of an aqueous bottom layer. The oily layer had a boiling range from 45° to 210° C., and about 40% of this layer distilled between 70° and 85° C. This narrow cut was found to consist largely of n-butylamine. The combined product from both layers, after reaction with hydrochloric acid, gave amine hydrochloride salts having melting points from 140° to 275° C. These amine products contained from 4 to 10 carbon atoms per molecule.

*Example II*

In another experiment, 150 parts by volume of a mixture of ethyl alcohol and hydrogen cyanide, containing two mols of the former for each mol of the latter, were vaporized and passed over an activated thoria catalyst in a reaction chamber at 290° to 320° C. during a period of three hours. From the recovered 135 parts by volume of condensable product, 50 parts by volume had a boiling range from 45° to 80° C. This fraction was similar in properties to the n-butylamine fraction obtained in Example I, when activated alumina was used as the catalyst.

The present invention is not to be considered as limited by any of the examples herein described nor by any theory of the process, but solely by the scope of the appended claims.

We claim:

1. A method of preparing primary aliphatic amines which comprises reacting diethyl ether with hydrogen cyanide in the presence of a dehydrating catalyst at a temperature of 275° to 350° C. at atmospheric pressure.

2. The method of preparing primary aliphatic amines which comprises passing a mixture of about three mols of diethyl ether and about one mol of hydrogen cyanide over activated alumina at 330° to 340° C. at atmospheric pressure and condensing the product formed.

3. A method of preparing primary aliphatic amines which comprises passing a vaporized mixture of about three molecular proportions of diethyl ether and about one molecular proportion of hydrogen cyanide over an activated alumina catalyst at 300° to 340° C. under atmospheric pressure and condensing the product formed.

4. A method of preparing primary aliphatic amines which comprises passing a vaporized mixture of about two molecular proportions of ethyl alcohol and about one molecular proportion of hydrogen cyanide over an activated thoria catalyst at 290° to 320° C. under atmospheric pressure and condensing the product formed.

5. A method of preparing primary aliphatic amines which comprises reacting a compound of the formula $C_2H_5OR$, where R is a member of the group consisting of hydrogen and an ethyl radical, with hydrogen cyanide in the presence of a dehydrating catalyst at a temperature of 200° to 400° C. at a pressure not substantially higher than atmospheric pressure.

6. A method of preparing primary aliphatic amines which comprises reacting ethyl alcohol with hydrogen cyanide in the presence of a dehydrating catalyst at a temperature of 275° to 350° C. at atmospheric pressure.

OBER C. SLOTTERBECK.
ALLEN R. KITTLESON.